US012562058B2

(12) United States Patent
Abedi et al.

(10) Patent No.: US 12,562,058 B2
(45) Date of Patent: Feb. 24, 2026

(54) ROAD-SIDE DETECTION AND ALERT SYSTEM AND METHOD

(71) Applicant: The Auto Club Group, Dearborn, MI (US)

(72) Inventors: Shohreh Abedi, Bloomfield Hills, MI (US); Luis Castro, Riverview, FL (US); Jeffrey Laskowski, Troy, MI (US); Viral Patel, Canton, MI (US)

(73) Assignee: The Auto Club Group, Dearborn, MI (US)

( * ) Notice: Subject to any disclaimer, the term of this patent is extended or adjusted under 35 U.S.C. 154(b) by 0 days.

(21) Appl. No.: 18/403,169

(22) Filed: Jan. 3, 2024

(65) Prior Publication Data

US 2024/0135811 A1 Apr. 25, 2024

Related U.S. Application Data

(63) Continuation of application No. 17/966,459, filed on Oct. 14, 2022, now Pat. No. 11,900,803, which is a (Continued)

(51) Int. Cl.
*G08G 1/0955* (2006.01)
*G08G 1/04* (2006.01)
*G08G 1/16* (2006.01)

(52) U.S. Cl.
CPC ............. *G08G 1/0955* (2013.01); *G08G 1/04* (2013.01); *G08G 1/166* (2013.01)

(58) Field of Classification Search
CPC ......... G08G 1/0955; G08G 1/04; G08G 1/166
(Continued)

(56) References Cited

U.S. PATENT DOCUMENTS 5,696,502 A 12/1997 Busch et al.
5,729,215 A * 3/1998 Jutras ...................... E01F 9/615 116/63 P
(Continued)

FOREIGN PATENT DOCUMENTS

CN 207397508 U 5/2018
CN 108877241 A 11/2018
(Continued)

OTHER PUBLICATIONS

International Search Report of International Application No. PCT/US2021/033219 mailed Sep. 8, 2021, 3 pages.
(Continued)

*Primary Examiner* — Eric Blount
(74) *Attorney, Agent, or Firm* — Brooks Kushman P.C.

(57) ABSTRACT

An alert system and method comprising at least one alert beacon having one or more sensors (e.g., LiDAR sensor). The alert beacon further including a processor operable to poll the LiDAR sensor for a predefined number of beta readings in response to receiving an initial reading from the LiDAR sensor indicating a vehicle is within a predefined distance away from the alert beacon. The processor further being operable to calculate an average distance and an average velocity for the vehicle in response to receiving the predefined number of beta readings when the vehicle is within the predefined distance from the alert beacon. The processor also being operable to activate an audible alert and a visual alert when the average distance is below a distance threshold and the average velocity exceeds a velocity threshold in response to calculating the average distance and the average velocity.

20 Claims, 6 Drawing Sheets

Related U.S. Application Data continuation of application No. 16/878,272, filed on May 19, 2020, now Pat. No. 11,508,239.

(58) Field of Classification Search
USPC .......................................................... 340/908
See application file for complete search history.

(56) References Cited

U.S. PATENT DOCUMENTS

| | | | | |
|---|---|---|---|---|
| 5,760,686 | A | 6/1998 | Toman | |
| 5,767,954 | A | 6/1998 | Laakmann | |
| 6,288,651 | B1 | 9/2001 | Souza | |
| 6,559,774 | B2 | 5/2003 | Bergan et al. | |
| 7,030,777 | B1 | 4/2006 | Nelson et al. | |
| 8,237,555 | B2 | 8/2012 | McCarthy | |
| 9,365,155 | B2 | 6/2016 | Hathaway et al. | |
| 9,489,841 | B1 | 11/2016 | Huggins | |
| 9,738,222 | B2 | 8/2017 | Hathaway et al. | |
| 9,792,820 | B1 * | 10/2017 | Russell, Jr. | H04R 1/403 |
| 10,046,699 | B2 | 8/2018 | Hathaway et al. | |
| 10,304,308 | B2 | 5/2019 | Mujeeb | |
| 10,319,227 | B2 | 6/2019 | Roy et al. | |
| 10,384,604 | B2 | 8/2019 | Hathaway et al. | |
| 10,480,731 | B2 | 11/2019 | Liu et al. | |
| 10,783,776 | B2 | 9/2020 | Hassani et al. | |
| 10,843,626 | B2 | 11/2020 | Yu et al. | |
| 10,953,796 | B2 | 3/2021 | Hathaway et al. | |
| 11,145,192 | B1 | 10/2021 | Wright | |
| 11,214,287 | B2 | 1/2022 | Lin et al. | |
| 11,238,726 | B2 | 2/2022 | Isaacs et al. | |
| 11,508,239 | B2 | 11/2022 | Abedi et al. | |
| 11,900,803 | B2 | 2/2024 | Abedi et al. | |
| 2012/0126996 | A1 * | 5/2012 | McCarthy | G08G 1/166 340/902 |
| 2014/0035737 | A1 | 2/2014 | Rashid et al. | |
| 2015/0054660 | A1 | 2/2015 | Simmons | |
| 2016/0232410 | A1 | 8/2016 | Kelly et al. | |
| 2016/0236638 | A1 | 8/2016 | Lavie et al. | |
| 2017/0316691 | A1 | 11/2017 | Miller et al. | |
| 2017/0323569 | A1 | 11/2017 | Willborn et al. | |
| 2018/0347752 | A1 * | 12/2018 | Costello | G01S 17/89 |
| 2022/0041102 | A1 | 2/2022 | Hathaway et al. | |

FOREIGN PATENT DOCUMENTS

| | | | | |
|---|---|---|---|---|
| CN | 110941223 | A | 3/2020 | |
| JP | 2005115794 | A | 4/2005 | |
| JP | 2009116577 | A | 5/2009 | |
| JP | 2013537331 | A | 9/2013 | |
| JP | 2016192145 | A | 11/2016 | |
| JP | 201822304 | A | 2/2018 | |
| KR | 20170084465 | A | 7/2017 | |
| WO | 2008073347 | A1 | 6/2008 | |
| WO | WO-2020190988 | A1 * | 9/2020 | F16P 3/141 |

OTHER PUBLICATIONS

Cole, Lee; Work Zone Safety—Intrusion Mitigation; 19 Pages.

Pro, Asphalt. "Oldcastle's AWARE System Makes Every Second Count." 2020, 12 pages.

* cited by examiner

ROAD-SIDE DETECTION AND ALERT SYSTEM AND METHOD

CROSS-REFERENCE TO RELATED APPLICATIONS

This application is a continuation of U.S. application Ser. No. 17/966,459, filed Oct. 14, 2022, which is a continuation of U.S. Ser. No. 16/878,272 filed May 19, 2020, now U.S. Pat. No. 11,508,239, issued Nov. 22, 2022, the disclosure of which is hereby incorporated in its entirety by reference herein.

TECHNICAL FIELD

An alert system and method are disclosed for activating an alert when an object (e.g., approaching vehicle) is detected as traveling at a given velocity and within a given distance of a roadside alert beacon.

BACKGROUND

Each year service technicians or emergency responders are injured when assisting or approaching distressed, stopped, or parked vehicles. For instance, accidents may occur when an approaching vehicle is traveling at an undesirable velocity or within an undesirable distance from the service vehicle or distressed vehicle. To prevent accidents and to provide advance warning to approaching vehicles, roadside cones or barrels that include flashing LED lights may be employed to alert the approaching vehicles that assistance is being provided. However, conventional cones or barrels may not always effectively provide advance warning to approaching vehicles, and conventional cones and alerts do not provide warnings to the service technician or emergency responders.

SUMMARY

An alert system and method for deployment on or along a roadway. The alert system may comprise at least one alert beacon having one or more sensors (e.g., LiDAR sensor). The alert beacon further including a processor operable to poll the LiDAR sensor for a predefined number of beta readings in response to receiving an initial reading from the LiDAR sensor indicating a vehicle is within a predefined distance away from the alert beacon. The processor further being operable to calculate an average distance and an average velocity for the vehicle in response to receiving the predefined number of beta readings when the vehicle is within the predefined distance from the alert beacon. The processor also being operable to activate an audible alert and a visual alert when the average distance is below a distance threshold and the average velocity exceeds a velocity threshold in response to calculating the average distance and the average velocity.

Each alert beacon may also include one or more digital camera(s) operable to acquire one or more digital images in response to receiving the initial reading from the LiDAR sensor indicating the vehicle is within the predefined distance away from the alert beacon. The processor may also be operable to calculate a second average distance and a second average velocity for the vehicle using the one or more images. The processor may be further operable to activate the audible alert and the visual alert when the second average distance is below the distance threshold and the second average velocity exceeds the velocity threshold. The processor may further be operable to analyze the one or more digital images to determine whether a service repair protocol is being performed.

Each alert beacon may also include a global positioning system (GPS) operable to provide a positioning data and a network interface operable to communicate with a remote server. Each processor may then be operable to transmit an identification and the positioning data of the at least one alert beacon in response to a request signal being received from the remote server. Each processor may also be operable to transmit the positioning data of the alert beacon to the remote server in response to receiving the initial reading from the LiDAR sensor indicating the vehicle is within the predefined distance away from the alert beacon. Each processor may be operable to navigate the at least one alert beacon to the geographical coordinate based on the positioning data in response to a request to deploy the at least one alert beacon to a geographical coordinate.

It is also contemplated that at least one of the alert beacons may be an aerial drone operable to hover about the geographical coordinate based on the positioning data. A mobile software application executing on a mobile device may also be operable to communicate with the at least one alert beacon. Each processor may then be operable to transmit a signal to the mobile software application to activate a visual notification and audible notification on the mobile device in response to receiving the initial reading from the LiDAR sensor indicating the vehicle is within the predefined distance away from the at least one alert beacon. Lastly, each processor may be operable to transmit a warning that is displayed upon an infotainment system within the vehicle in response to receiving the initial reading from the LiDAR sensor indicating the vehicle is within the predefined distance away from the alert beacon.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
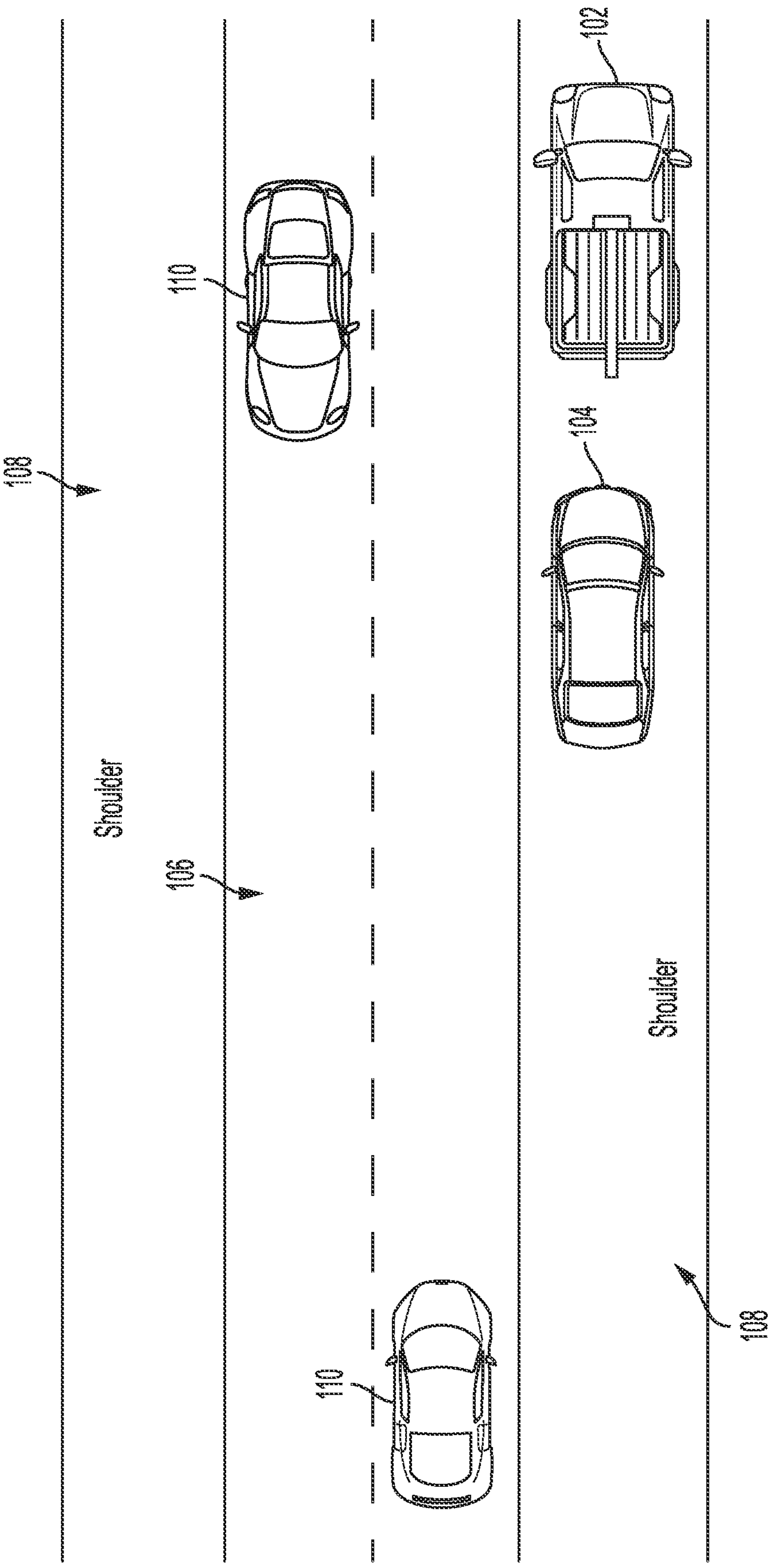
FIG. 1 is an exemplary situation where one or more oncoming vehicles are approaching a service vehicle and distressed vehicle.

Each year people may be injured when trying to assist or approach distressed, stopped, or parked vehicles. For instance, FIG. 1 illustrates a service vehicle 102 parked behind a distressed vehicle 104 in need of service. The distressed vehicle 104 may be parked along one-side of a road 106 or upon a shoulder 108. A service assistant may exit the service vehicle 102 and approach the distressed vehicle 104 to provide assistance near the road 106 or along the shoulder 108. If the assistance requires towing the distressed vehicle 104, the service assistant may need to connect a towing hitch to the distressed vehicle 104.

While the service assistant is connecting the two vehicles, changing a tire, or fixing the distressed vehicle 104 in some way, the service assistant might not be aware of the location or speed of the approaching vehicles 110. Alternatively, objects (e.g., concrete, stones, or items from approaching vehicles 110) may project dangerously close toward the service vehicle 102 and distressed vehicle 104 where the service technician is operating. Unaware of the approaching vehicles 110 or objects, a potentially hazardous condition may arise for the service assistant, occupants within the distressed vehicle 104, or occupants of the approaching vehicles 110. It is therefore desirable to provide a system and method for detecting and providing advance warning when such potentially hazardous conditions arise.

Figure 2:
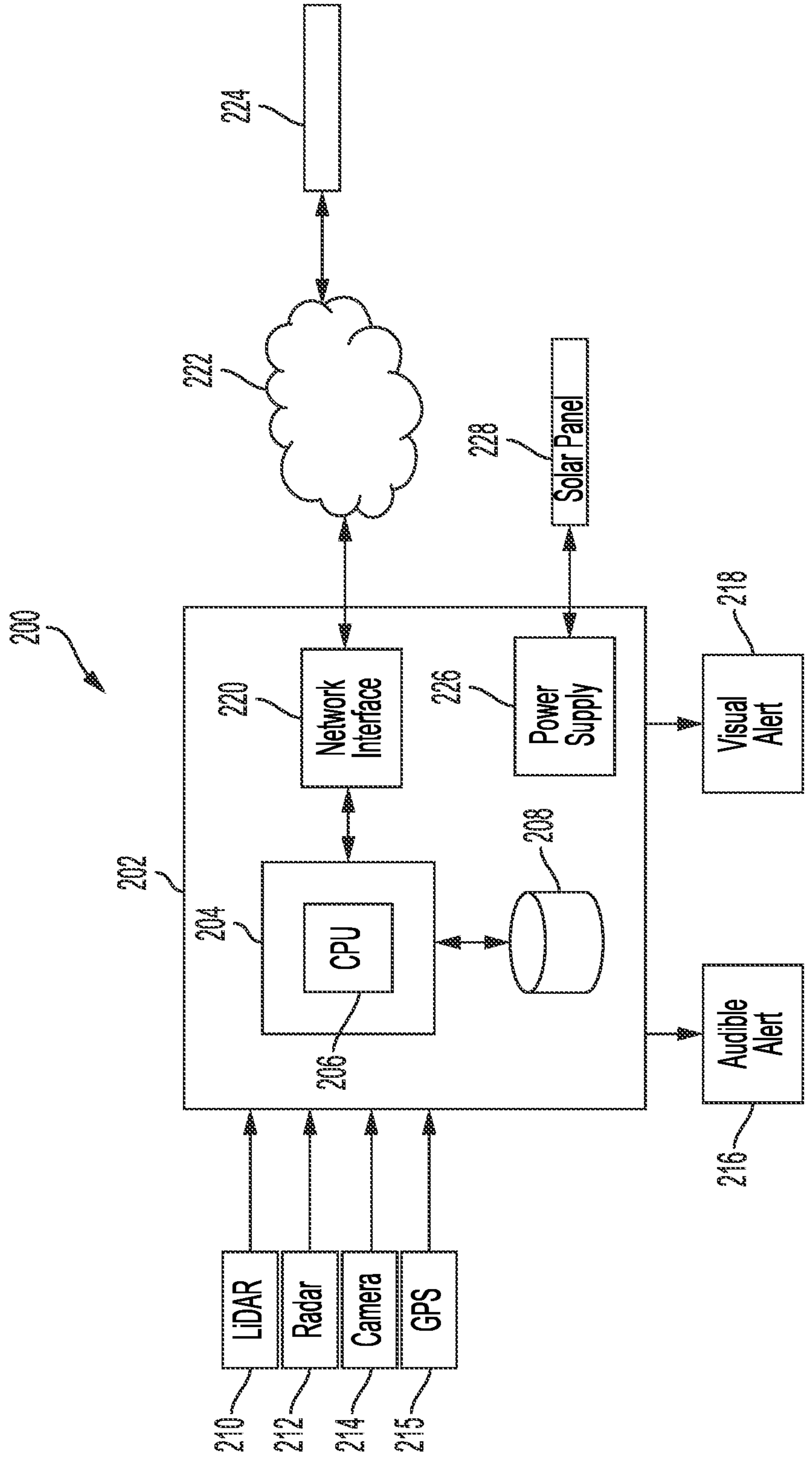
FIG. 2 is an exemplary embodiment of the roadside alert system.

FIG. 2 illustrates an alert system 200 that may be deployed for detecting and providing alerts when it is determined that an object (e.g., approaching vehicles, concrete, stones, or other items) is approaching at an undesired speed and/or path. It is contemplated that the alert system 200 may be deployed to monitor the workspace where a service technician is aiding a distressed vehicle 104 or the occupants within the distressed vehicle 104.

The alert system 200 may include at least one alert beacon 202. The alert beacon 202 may include at least one processor 204 that is operatively connected to a memory unit 208. The processor 204 may be one or more integrated circuits that implement the functionality of a CPU 206 (i.e., central processing unit). The processor 204 may be a microcontroller board (e.g., Arduino microcontroller). Or, processor 204 may be a commercially available CPU that implements an instruction such as one of the x86, ARM, Power, or MIPS instruction set families During operation, the CPU 206 may execute stored program instructions that are retrieved from the memory unit 208. The stored program instructions may include software that controls operation of the CPU 206 to perform the operation described herein. In some examples, the processor 204 may be a system on a chip (SoC) that integrates functionality of the CPU 206, the memory unit 208, a network interface, and input/output interfaces into a single integrated device. The processor 204 may implement an operating system for managing various aspects of the operation.

The alert beacon may include an electrical energy power supply 226 that may comprise a DC-battery or high-voltage capacitor. In operation, the power supply 226 may receive recharging energy from an external solar panel 228. Alternatively, a wind turbine may provide recharging energy to the power supply 226. It is also contemplated that power supply may be connected to an AC-energy source (i.e., 120-V AC outlet) that may be used to recharge the power supply 226.

The memory unit 208 may include volatile memory and non-volatile memory for storing instructions and data. The non-volatile memory may include solid-state memories, such as NAND flash memory, magnetic and optical storage media, or any other suitable data storage device that retains data when the alert system 200 is deactivated or loses electrical power. The volatile memory may include static and dynamic random-access memory (RAM) that stores program instructions and data.

The alert beacon 202 may include one or more sensors. For instance, the alert beacon 202 may include a light detection and ranging (LiDAR) sensor 210 operable to use light in the form of a pulsed laser that alert beacon 202 may use to measure a distance, velocity (using a change in distance), rate of acceleration, or velocity of an approaching objects. As discussed below, the processor 204 may be operable to algorithmically detect incoming objects and calculate their velocity in miles per hour using the data provided by the LiDAR sensor 210.

The alert beacon 202 may also include other radar sensors 212 such as ultra-sonic radar sensors or short/medium/long-range radar sensors that are similarly operable to transmit pulsed signals that may be used by alert beacon 202 for measuring ranges (distances) from objects. The alert beacon 202 may include a digital camera 214 operable to capture images or video that may then be processed by alert beacon 202 for detecting stationary or incoming objects. The alert beacon 202 may also include a global positioning system (GPS) 215 for detecting the location of the alert beacon 202.

The alert beacon 202 may further include one or more audible alerts 216. The audible alerts 216 may comprise a speaker that provides a spoken warning or siren to people within a given radius of the alert beacon 202. Or the audible alerts 216 may include multiple, unique alarms that provide different notifications to the service technician. For instance, one unique alarm may be used to alert the service technician that an approaching vehicle 110 is approaching from behind the distressed vehicle 104 and a different alert may be used for approaching vehicles 110 that may be on a path in front of the distressed vehicle 104.

The alert beacon 202 may further include one or more visual alerts 218 to people within a given radius of the alert system 200. For instance, the visual alert 218 may include a light system (e.g., one or more light-emitting diodes (LED)) that can provide a constant, flashing, or blinking visual warning to people. Or, the visual alert 218 may be an electronic message board that is operable to provide readable and modifiable warnings to people.

It is contemplated that the audible alerts 216 and/or the visual alerts 218 may be used to warn the occupants of the approaching vehicle 110, the service technician, or the occupants of the distressed vehicle 104. It is also contemplated that one or more relays may be used by the alert beacon to activate and operate the audible alerts 216 and visual alerts 218 to warn the occupants of the approaching vehicle 110, the service technician, or the occupants of the distressed vehicle 104. It is also contemplated that the audible alerts 216 and/or the visual alerts 218 may operate to alert the occupants (i.e., driver) of the approaching vehicle 110 to deviate course away from the alert beacon 202, service vehicle 102, and/or distressed vehicle 104. Or, the audible alerts 216 and/or the visual alerts 218 may operate to alert the service technician or the occupants of the distressed vehicle 104 to move away from the approaching vehicle 110.

The alert beacon 202 may include a network interface device 220 that is configured to provide communication with external systems and devices. For example, the network interface device 220 may include a wired and/or wireless Ethernet interface as defined by Institute of Electrical and Electronics Engineers (IEEE) 802.11 family of standards. The network interface device 220 may include a cellular communication interface for communicating with a cellular network (e.g., 3G, 4G, 5G). The network interface device 220 may be further configured to provide a communication interface to an external network 222 or cloud.

The external network 222 may be interconnected to the world-wide web or the Internet. The external network 222 may establish a standard communication protocol between one or more external computing devices 224. The external network 222 may allow information and data to be easily exchanged between computing devices 224 and the network interface 220. For instance, the external devices 224 may comprise one or more servers that are in communication with alert beacon 202 via the external network 222. Or external devices 224 may include mobile devices (e.g., smart phone, smart watch) that are in communication with alert beacon 202 via the external network 222.

It is further contemplated that the alert system 200 may be implemented using one or more alert beacons 202. While FIG. 2 illustrates just a single alert beacon 202, it is intended that each of the various features and functions described above may be separated and implemented by multiple alert beacons 202. For instance, the alert system 200 may comprise multiple alert beacons 202 each having separate sensors 210-214, audible alerts 216, and visual alerts 218. Each of the alert beacons 202 may operate independently or the alert beacons 202 may be in communication and operating as a mesh network. Also, the alert beacons 202 may be in communication with a remote server (e.g., device 224) using external network 222 that may be used to monitor or deploy the alert beacons 202.

When multiple alert beacons 202 are employed, the alert system 200 may use external network 222 to communicate between each individual alert beacon 202. For instance, the alert system 200 may be operable to use external network 222 to communicate between a first alert beacon 202 situated in front of the distressed vehicle 104 and a second alert beacon 202 situated behind the service vehicle 102. Placement of multiple alert beacons 202 provides the alert system 200 with the capability of using LiDAR 210, radar 212, or camera 214 to scan vehicles or objects approaching in multiple directions (e.g., vehicles approaching toward the front end of the distressed vehicle 104 or from the rear-side of the service vehicle 102). In addition, implementing multiple alert beacons 202 provides the alert system 200 with redundancy so that if one alert beacon 202 stops operating the remaining alert beacons 202 may continue operating to scan, detect, and alert about approaching vehicles 110 or objects.

The alert beacon 202 may be designed to operate in extreme weather conditions across differing geographic regions. For instance, the alert beacon 202 may be designed to operate in extreme cold or warm weather, or when exposed to rain, sleet, or snow. It is therefore contemplated that the alert beacon may be hermetically sealed or positioned within an Ingress Protection (IP) enclosure to protect the components (e.g., processor 204, LiDAR 210) from the various weather conditions and climate changes.

FIG. 3A-3D illustrate various exemplary alert beacons 202 that may be deployed as part of an alert system 200 for detecting and providing alerts about oncoming objects (e.g., approaching vehicles, debris). It is contemplated that the alert beacons 202 may be deployed by a service assistant to detect potentially hazardous objects while the distressed vehicle 104 is being serviced. However, it is also contemplated that the alert beacons 202 may be deployed by police, fire, or ambulance service people providing emergency services. Or, the alert beacons 202 may be designed as commercial systems available and deployable by motorists.

Figure 3A:
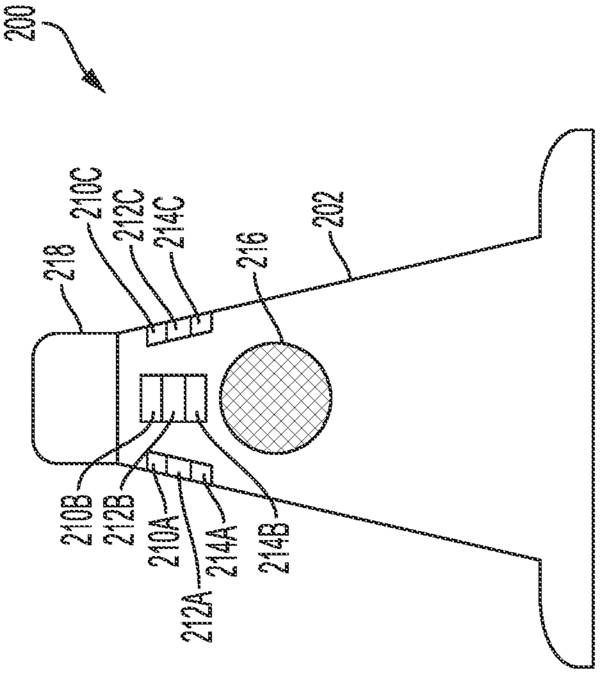
FIGS. 3A-3D are exemplary embodiments of alert beacons that may be employed by the alert system.

Again, the alert beacon 202 may include one or more audible alerts 216 and/or visual alerts 218 operable to indicate the presence of the service vehicle 102 or distressed vehicle 104 to an approaching vehicle 110. Or, the audible alerts 216 and/or visual alerts 218 may also be operable to indicate the presence of approaching vehicle 110 to the service assistant. As shown by FIG. 3A, the visual alert 218 may include a bucket-light light emitting display (LED) that indicates to approaching vehicle 110 the presence of the service vehicle 102 or distressed vehicle 104. As discussed above, the audible alert 216 may be designed using a speaker system for providing an audible indication to the service assistant that the approaching vehicles 110 are approaching at an unsafe speed or distance.

It is also contemplated that the alert system 200 may operate by detecting whether an approaching vehicle 110 is within a predetermined range using data provided by the LiDAR sensor 210 or radar 212. The processor 204 may include instructions to perform an error checking to remove any false positive data received from LiDAR sensor 210 or radar 212.

The processor 204 may also operate on beta measurements or samples for approaching objects (i.e., approaching vehicle 110) before determining an average distance. If processor 204 determines the measurement is not within a predefined range, the processor 204 may not store the measurements within memory 208 and/or the processor 204 may discard the measurements. The processor 204 may continue polling LiDAR sensor 210 or radar 212 until there exists a predetermined number of readings (i.e., beta readings) within a predetermined range (e.g., [Gama, Delta] centimeters) as shown by Equation (1) below:

$$\frac{\sum_{i=1}^{9} x_i[\text{Gama, Delta}]}{\text{Beta}} \quad \text{(Equation 1)}$$

In Equation (1), $x_i$ is the distance of an approaching object in centimeters (cm). Once the processor 204 calculates the average distance, the processor 204 may further calculate a velocity for the approaching object. The velocity for the approaching object may be expressed as the change in position (centimeters) divided by change in time (milliseconds) as shown by Equation (2) below:

$$\text{Velocity} = \frac{\Delta \text{ Position}}{\Delta \text{ Time}} \Rightarrow \frac{p_1 - p_0}{t_1 - t_0} \quad \text{(Equation 2)}$$

Where $p_i$ is a position at iteration i and $t_i$ is the time at iteration i. The processor 204 may also be operable to convert the calculated velocity into miles per hour (MPH). The processor 204 may convert the calculated velocity from centimeters/milliseconds to miles/hours using Equations (3), (4), (5) below:

$$\text{Miles} = \frac{\text{Centimeters}}{30.48} \div 5280 \quad \text{(Equation 3)}$$

$$\text{Hours} = \frac{\text{Milliseconds}}{1000} \div 3600 \quad \text{(Equation 4)}$$

$$MPH = \frac{\text{Miles}}{\text{Hours}} \quad \text{(Equation 5)}$$

Processor 204 may also determine if the velocity of the object (i.e., approaching vehicle 110) is moving at a speed greater than or equal to a predetermined velocity (e.g., 25 MPH) and whether the velocity of the object is at a distance less than or equal to a predetermined distance (e.g., 3000 cm) as shown by Equation (6) below:

$$z = f(x, y) = \begin{cases} \text{true}, & x > 25 \text{ and } y \le 3000 \\ \text{false}, & x < 25 \text{ and } y \ge 3000 \end{cases} \quad \text{(Equation 6)}$$

Where z may be an output indicating whether an audible alert 216 or visual alert 218 should be activated, x is speed in miles per hour (MPH), and y is distance in centimeters (cm). If the processor 204 determines the object is within the predetermined velocity and distance, then the processor may activate the visual alert 218 (e.g., LED light) or audible alert 216 (e.g., loud siren).

FIG. 3A also illustrates that the alert beacon 202 may include multiple LiDAR sensors 210A-210C, multiple radar sensors 212A-212C, and multiple cameras 214A-210C. The LiDAR sensors 210A-210C, radar sensors 212A-212C, and cameras 214A-210C may be located at various positions around the alert beacon 202. By including multiple LiDAR sensors 210A-210C, radar sensors 212A-212C, and cameras 214A-210C the alert beacon 202 may be operable to scan approaching objects or vehicles in all directions. For instance, the alert beacon 202 may use the multiple LiDAR sensors 210A-210C, radar sensors 212A-212C, and cameras 214A-210C to scan all approaching vehicles 110 regardless of which direction they may be approaching the service vehicle 102 or distressed vehicle 104. It is also contemplated that only one set of LiDAR, radar and camera (e.g., 210A, 212A, 214A) may be included and may be designed to rotate around the alert beacon 202 to scan for approaching objects or vehicles in all directions.

Figure 3C:
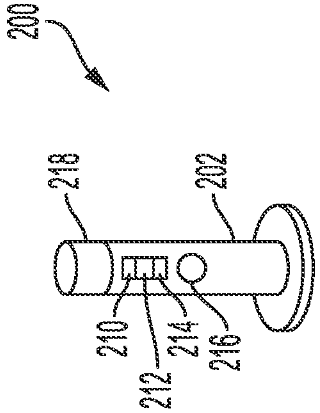
Figure 3B:
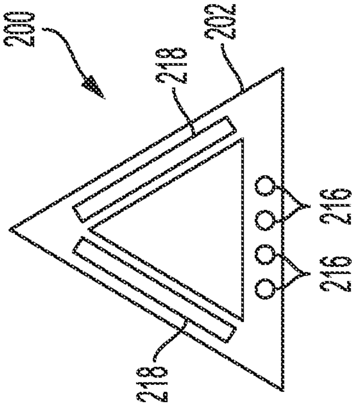

As illustrated in FIG. 3A, alert beacon 202 may be designed or shaped as a traffic cone. It is contemplated, however, that the alert beacon 202 may be shaped or deployed in other forms or manners dependent upon a given application. For instance, FIG. 3B illustrates the alert beacon 202 designed as a roadside emergency triangle. As shown by FIG. 3B, multiple visual alerts 218 (e.g., LED lighting system) may be included to provide visual alert to approaching traffic, service assistants, or bystanders. FIG. 3B also illustrates that multiple audible alerts 216 may be included within alert beacon 202. Depending upon the size or application of the alert beacon 202, additional audible alerts 216 and visual alerts 218 may be desired. FIG. 3C further illustrates the alert beacon 202 designed as a roadside cylinder.

Figure 3D:
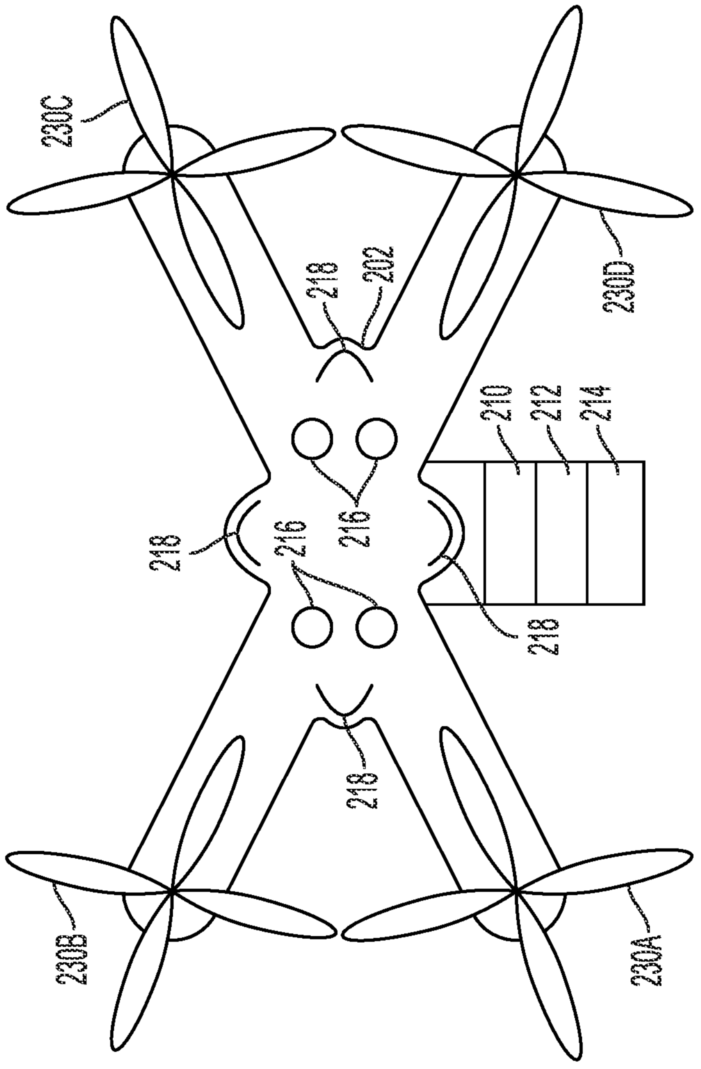

FIG. 3D illustrates the alert beacon 202 may also be designed as an aerial drone. As used within this application, the term "drone" may refer to an aerial vehicle capable to operating autonomously to perform a predetermined function, or the aerial vehicle may be controlled by the human operator. The alert beacon 202 may include one or more thrust devices 230A-230D. As shown, the plurality of thrust devices 230A-230D, are arranged about the periphery and include propeller members that rotate to produce thrust. The thrust devices 230A-230D may be configurable to provide both lift (vertical thrust) and lateral thrust (horizontal thrust). The vertical and horizontal components of the thrust allow the changing of the altitude, lateral movement and orientation (attitude) of the alert beacon 202.

Lastly, it is contemplated that the alert beacon 202 may also be designed as a clothing article or an IoT device that a service technician may wear when assisting a distressed vehicle 104. The alert system 200 may still provide wireless connectivity between the alert beacon 202 (i.e., clothing article or IoT device) worn by the service technician and additional alert beacons 202 positioned around the service vehicle 102 and distressed vehicle 104. However, it is also contemplated that the clothing article or IoT device may be an alternative form of the alert system 200 independent of the alert beacons 202 illustrated by FIGS. 4A-4D.

For instance, the clothing article may be a vest worn by the service technician. The vest may include one or more LiDAR sensors or radar sensors for detecting the location and speed of approaching vehicles 110 or objects. The vest may also include one or more camera sensors for detecting and recording video. The vest may be operable to determine if an oncoming vehicle is approaching within a predetermined distance or speed of the service vehicle 102 or distressed vehicle 104. The vest may include audible and visual alerts that may then be activated to notify the service technician about the approaching vehicle 110 or object. If employed as wearable glasses or contact lenses, the alert system 200 could display visual alerts to the service technician. Or, the clothing article may be a smart watch (e.g., Android watch or Apple watch) where a mobile software application could be utilized on smart watches to provide visual or audible alerts to the service technician.

Figure 4A:
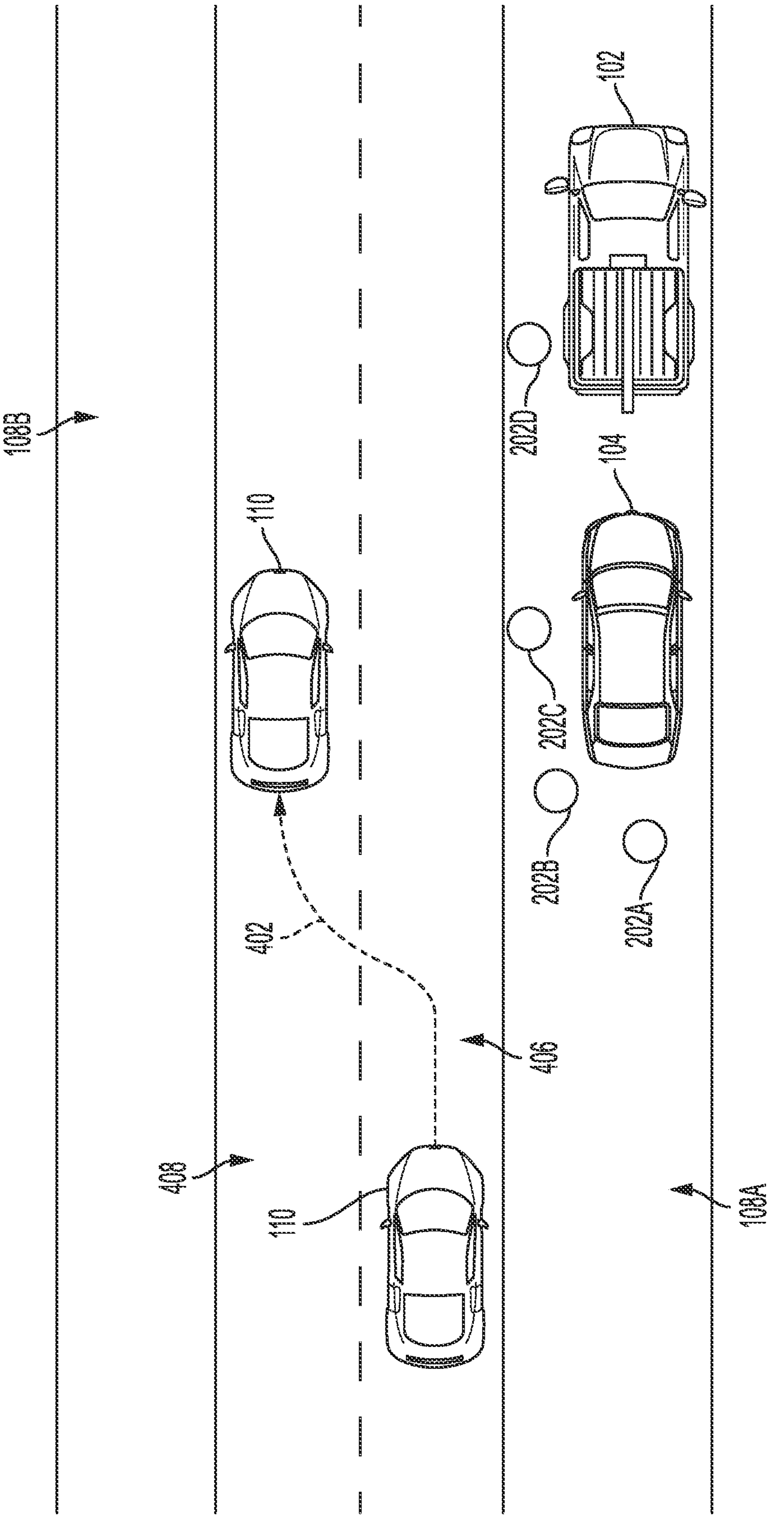
FIGS. 4A and 4B are illustrative examples of a vehicle approaching along a predetermined path toward the alert beacons, the service vehicle, and the distressed vehicle.

FIG. 4A illustrates an alert system 200 with numerous alert beacons 202A-202D situated around the service vehicle 102 and the distressed vehicle 104. It is contemplated that the service technician may deploy and situate the alert beacons 202A-202D in a vicinity surrounding the service vehicle 102 and the distressed vehicle 104. Or, each alert beacon 202A-202D may include a motor and wheels that allow automatic deployment from the service vehicle 102. The alert system 200 may therefore automatically position the alert beacons 202A-202D in a vicinity surrounding the distressed vehicle 104 without assistance from the service technician.

It is contemplated, however, that the service technician may manually control placement of the alert beacons 202A-202D using network interface 220. For instance, the service technician may use a mobile device or remote control that is wirelessly connected to each alert beacon 202A-202D through the network interface 220. The service technician may use, for instance, a mobile app that allows selection of each alert beacon 202A-202D. Following selection of the alert beacon 202A-202D, the mobile app may provide the service technician with the capability of controlling placement of the alert beacon 202A-202D.

Again, each alert beacon 202A-202D may be an aerial drone as illustrated by FIG. 3D that is operable to hover above the vicinity of the service vehicle 102 and the distressed vehicle 104. When deployed using an aerial drone, the alert beacons 202A-202D may also be situated above the first lane 406, second lane 408, or the roadside shoulders 108A, 108B. When the drone is hovering above approaching vehicles 110, the visual alerts 216 (e.g., LED lights) may be visible at a greater distance away from the service vehicle 102. The visual alert 216 may be a flashing light that when activated may be visible by approaching vehicle 110 for distances greater than ¼ of mile. The increased visibility may be because the drone is not obstructed by other vehicles or roadside obstacles.

It is also contemplated that each alert beacon 202A-202D also includes a motorized assembly (not shown) that is controlled by processor 204 to self-level the LiDAR 210, radar 212, and camera 214 regardless of the road grade. For instance, the processor 204 may be programmed to: (1) scan downward until the ground is detected; (2) scan upward to detect a horizon; and (3) auto-level the LiDAR 210 at a position that projects toward the approaching vehicle 110. Or the processor may provide self-leveling using an accelerometer to determine a specific orientation of the LiDAR 210, radar 212, and camera 214 and to measure different values of downward acceleration due to gravity.

It is further contemplated each alert beacon 202A-202D may be physically attached to the service vehicle 102. For instance, each alert beacon 202A-202D may be attached to a light bar atop the service vehicle 102 or through equipment attached inside or outside the service vehicle 102. The LiDAR 210, radar 212, and camera 214 may also be positioned around the service vehicle 102 and may be used by processor 204 to detect approaching vehicles 110 approaching from various directions. The LiDAR 210, radar 212, and camera 214 may also be controlled by the service technician or may automatically be activated in conjunction with traffic flow and road position.

As shown by FIG. 4A, the alert beacons 202A-202D may be positioned behind the service vehicle 102 and near the edge of the shoulder 108. An approaching vehicle 110 may initially be approaching in a first lane 406 toward the alert beacon 202. But as the approaching vehicle 110 is alerted to the alert beacon 202, the approaching vehicle 110 may be steered along first path 402 into the second lane 408. It is contemplated that the approaching vehicle 110 may be steered into the second lane 308 once the visual alert 218 (e.g., LED bucket light) is seen by the driver. Or, the oncoming vehicle 110 could send a message to the vehicle, phone or IOT device to move over into the second lane. Or, the approaching vehicle 110 may be autonomously controlled and may be steered into the second lane 408 based on sensed or received data that is transmitted by alert system 200. Having been repositioned into the second lane 408, the alert system 200 may not activate audible alert 216.

Figure 4B:
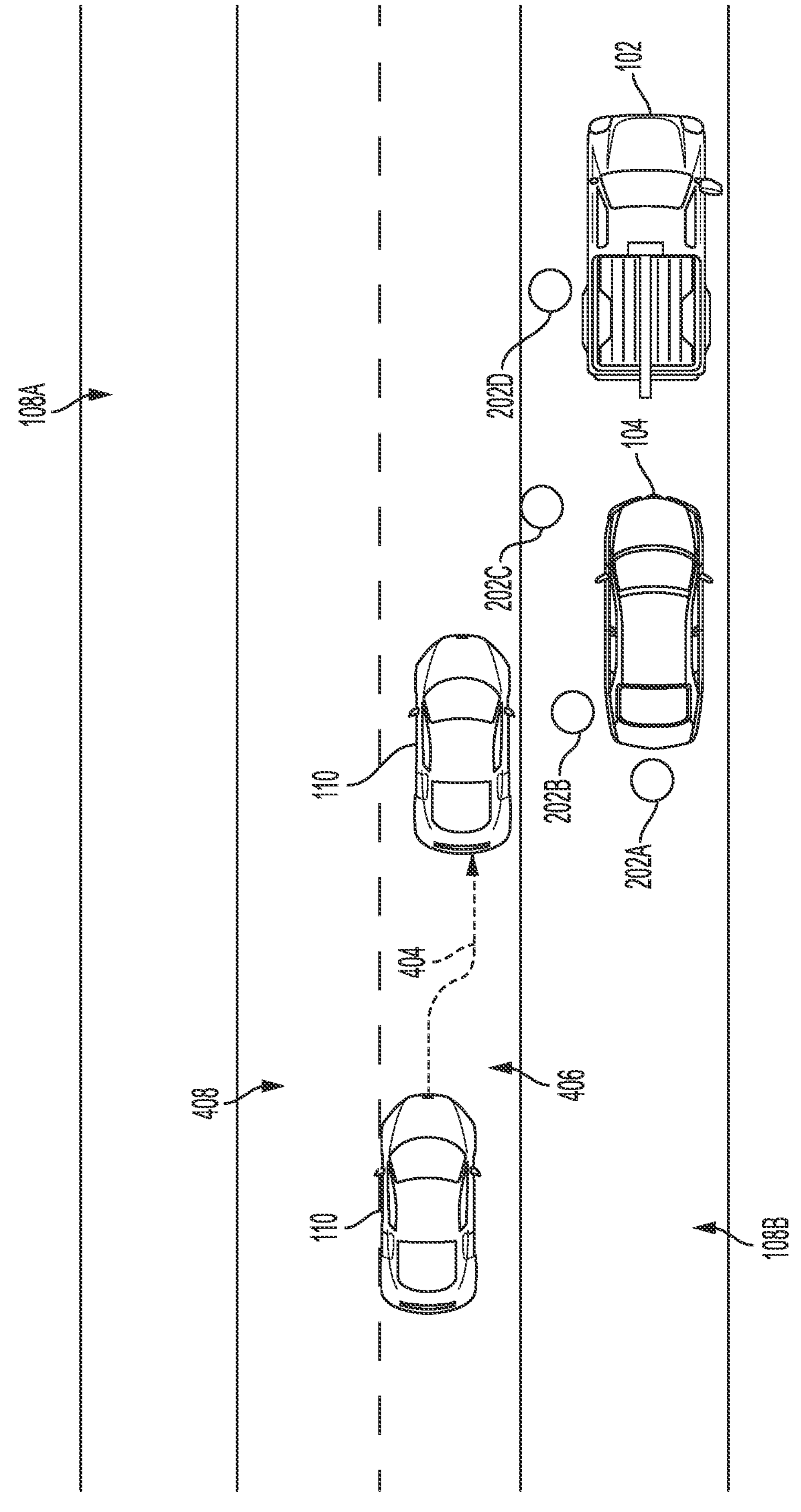

However, as shown by FIG. 4B, the approaching vehicle 110 may not deviate from the first lane 406. Instead, the approaching vehicle 110 may travel along second path 404 approaching near alert beacon 202. The approaching vehicle 110 may approach closer to alert beacon 202 even though visual alert 218 has been activated and is operating to alert the occupants of the approaching vehicle 110. Once the approaching vehicle 110 reaches a predetermined distance or velocity from alert beacon 202 the audible alert 318 may be activated to alert the service technician. The audible alert 318 may be alerted when approaching vehicle 110 has reached a predetermined distance or velocity such that the service technician would have enough time to reposition themselves, and possibly warn occupants of the distressed vehicle 104.

It is also contemplated that the camera 214 may be operable to provide video recording of the area surrounding the distressed vehicle 104. The camera 214 may be operated whenever an alert beacon 202 is deployed. Or, the camera 214 may only be operable to record video when an approaching vehicle 110 is determined as moving above a predetermined velocity (i.e., speed) or within a predetermined direction of the distressed vehicle 104, service vehicle 102, or alert beacon 202. The predetermined velocity and direction values may be stored within memory 208. The predetermined direction and velocity values may be calibratable or may be adjusted by the service technician. The alert beacon 202 may also be operable to record and store the digital images, recorded video, or video segments acquired from camera 214 within memory 208 or stored in external network 222. Additionally, the camera 214 may also be used by the processor 204 in conjunction with a machine learning algorithm to determine if the service technicians are following a predetermined series of safety or operational protocols while assisting occupants of the distressed vehicle 104.

The alert system 200 may also be operable to transmit the video using external network 222 to a remote storage (e.g., device 224) that may be located within service vehicle 102. Or, the alert beacon 202 may operably transmit the video using external network 222 to a remote server (e.g., Corporate Server or cloud-based storage like Amazon Web Services). The transmitted video may then be observed by remote workers either while service is being provided, or at a later time. The remote workers may observe the video to provide supervision and oversite for the work being performed by the service technician. Or the remote workers may observe the video as an extra level of safety for the service technician and the occupants of the distressed vehicle 104. Video and GPS positions could be live streamed via network interface 220 and external network 224 to a central location allowing supervisors and fleet operators the ability to oversee operations in real time.

The alert system 200 may also be operable to process the real time traffic analytics stored within memory 208 using the video collected from camera 214. Traffic analytics may again be transmitted using external network 222 to central system or cloud-based storage (e.g., device 224) that may be monitoring multiple alert systems 200 (i.e., multiple emergency service vehicles) distributed across various locations. Traffic analytics data could be used both internally and externally to provide more accurate information to service technicians and to motorists.

Data from the GPS 215 may likewise be transmitted to the monitoring service or emergency service (via external network 222) when processor 204 determines the approaching vehicle 110 is approaching at a given speed, distance, or path toward the service vehicle 102, distressed vehicle 104, or alert beacon 202. The data provided by the GPS 215 may also be processed for internal analytics regarding prevalent distressed vehicle locations.

The alert system 200 may also be operable to transmit an alert using external network 222 to an infotainment system, heads-up display, video monitor, or mobile device located within an approaching vehicle 110. For instance, the alert system 200 may also employ external network 222 to provide geo-fencing capabilities that can provide the alert within the oncoming vehicles. The alert system 200 may transmit to the approaching vehicle 110 over the external network 222 data indicating the location of the service vehicle 102, distressed vehicle 104, or the alert beacon 202. The alert system 200 may also receive from the external network 222 data indicative of the location of the approaching vehicle 110. The alert system 200 may determine when to activate the audible alert 216 or the visual alert 218 based on the location and velocity of the approaching vehicle 110 in relation the service vehicle 102, distressed vehicle 104, or the alert beacon 202. It is further contemplated that the alert system may be in communication with mobile software applications that may then provide route information to drivers and give real-time traffic information to advise occupants of the approaching vehicles 110.

The alert system 200 may also transmit instructions from network interface 220 over external network 222 to slow a given speed of approaching vehicles 110. For instance, the alert system 200 may transmit data or instructions over external network 222 notifying local emergency services regarding the distressed vehicle 104. The local emergency services may be equipped to transmit a notification signal to approaching vehicles 110 nearing the proximity of the distressed vehicle 104 (e.g., ¼ mile radius). Upon receiving the notification signal, the approaching vehicles 110 may be programmatically controlled to reduce to a specified speed (e.g., 25 MPH) regardless of whether the driver attempts to depress the accelerator pedal. It is contemplated that notification signal may not be required as coming from an emergency service location but could be transmitted by alert system 200 or monitoring service that is in communication with alert system 200.

It is also contemplated that the alert system 200 may transmit notification signals operable to initiate automatic braking or collision avoidance within the approaching vehicles 110. For instance, the notification signals may be used to provide automatic braking within approaching vehicles 110 that are approaching within a predetermined velocity or distance to the alert beacon 202, service vehicle 102, or distressed vehicle 104. Or, the notification signal may be used to steer the approaching vehicle 110 away from the alert beacon 202, service vehicle 102, or distressed vehicle 104.

The alert system 200 may further be operable to use external network 222 to connect with a roadside billboard or municipal notification system to provide additional alerts to approaching vehicles 110. For instance, many roadside billboards are now equipped as video electronic displays. The alert system 200 may be operable to connect with such billboards (either directly or a through a notification service) using the external network 222 so that information may be provided to approaching vehicles 110. Many cities are also equipped with electronic signage that may be used to alert the approaching vehicles 110 about current traffic conditions. These electronic signs may also be used by the alert system 200 to notify approaching vehicles 110 about the location of the service vehicle 102, distressed vehicle 104, or the alert beacon 202.

The alert system 200 may also be operable to connect using external network with a mobile device worn by the service technician. For instance, the alert system 200 may include a mobile software application that may be downloaded on a mobile device (e.g., app available and downloadable onto an Apple or Android smart phone). The mobile software application may employ audible or visual alert capabilities of the mobile device to alert the service technician when it is determined that the velocity of an approaching vehicle 110 is above a predetermined threshold, or the direction of an approaching vehicle 110 is within a predetermined distance.

The alert system 200 may be integrated to operatively use sensors or alert systems located within a service vehicle 102. Or, the alert system 200 may integrate, or alternatively rely on, sensors located within a distressed vehicle 104. For instance, the distressed vehicle 104 may be operable to include functionality that allows service technician to connect the alert system 200 to sensors (e.g., LiDAR, cameras) positioned within the distressed vehicle 104. The sensors located within the distressed vehicle 104 may then be implemented by the alert system 200 to further detect and provide alerts about approaching vehicles 110 or objects.

The alert system 200 may also transmit to external network 222 data indicative of traffic patterns surrounding the distressed vehicle 104. Or the alert system 200 may transmit instructions requesting re-routing of traffic away from the distressed vehicle 104. The data and instructions may be provided to mapping software providers (e.g., Google or Waze) so that approaching vehicles 110 may be informed and/or re-routed away from the distressed vehicle 104. For instance, the alert system 200 may request that approaching vehicles 110 be re-routed a given distance (e.g., ½-mile) away from distressed vehicle 104.

It is further contemplated that the area surrounding the distressed vehicle 104 may have moveable traffic flow devices. For instance, certain roadways include lane diversion systems that permit for an additional or alternative traffic lane. Alert system 200 may activate and use this additional or alternative traffic lane to re-route approaching vehicles 110 away from distressed vehicle 104 to provide safe working environment for service technician.

The alert system 200 may also be designed to receive information regarding the location where the distressed vehicle 104 is located. For instance, the distressed vehicle 104 may be located in a highly traversed area, an area that includes visual obstructions for approaching vehicles 110 (e.g., bridges, bushes), or a location that does not include suitable space to service the distressed vehicle 104 (e.g., an area with a small or no shoulder). The alert system 200 may be operable to evaluate and determine if the distressed vehicle 104 is located at an area that is unsafe for the service technician. The alert system 200 may be operable to alert the distressed vehicle 104 to proceed to different location prior to being serviced.

It is also contemplated that the alert system 200 may operably receive from external network 222 data from local weather services about pending weather conditions surrounding the distressed vehicle 104. If the alert system 200 determines that the received data about the weather conditions may increase the potential for accidents with approaching vehicles 110 additional safety measures may be employed. For instance, if the alert system 200 receives data about a severe snow storm or that there exists icy road conditions around the distressed vehicle 104, the alert system 200 may require increased coverage by the alert beacons 202 surrounding the distressed vehicle 104. The radius and number of the alert beacons 202 may also be increased to ensure the alert system 200 can provide advanced alert warnings to the service technician. The alert system 200 may also operably employ a machine learning algorithm so that the service vehicle 102 could access telematics data to determine any deterioration in alert beacons 202 which would lead to a breakdown or equipment failure.

It is further contemplated that the alert system 200 may implement a facial recognition algorithm, blockchain algorithm, optical character recognition (OCR), or image recognition for tracking and detecting potential misplacement or theft of any one of the alert beacons 202. For instance, an alert beacon 202 may be taken from the roadside or from the back of a service vehicle 102. Using the network transmitter 220, the processor 204 may transmit digital images acquired by the camera 214. A facial recognition algorithm may be employed by processor 204 to identify the individual responsible for taking the alert beacon 202. Also, the processor 204 may employ GPS data from GPS 215 to determine and transmit the location of the alert beacon 202 for retrieval by authorities.

The processor 204 may also employ camera 214 to acquire images of the license plates from oncoming vehicles 110. The alert system 200 may use external network 222 to communicate with an external server (e.g., police database) or emergency services when it is determined that an acquired license plate is that of a stolen or missing vehicle. The alert system 200 may detect when a stolen or missing vehicle using the image acquired by the camera 214. The alert system 200 may send a notification (using external network 222) to the local authorities (e.g., police department) with a location where the stolen or missing vehicle was identified.

Should the alert system 200 be unable to capture license plates, it may still capture images of vehicles and use object/color detection to get the make, model and color of the stolen or missing vehicle.

The LiDAR sensor 210, radar sensor 212, camera 214, and GPS 215 may also be used to create a surface or topographical map pertaining to where the distressed vehicle 104 is situated. The surface/topographical map may be used by the alert system 200 to detect for hazardous road conditions or obstacles. The alert system 200 may then provide alerts to the service technician if a road condition or obstacle may present a dangerous work environment. For instance, the surface map may indicate that a large pothole exists near the distressed vehicle 104. The alert system 200 may provide an audible or visual warning to the service technician about the pothole. The service technician may then use the alert to add additional alert beacons 202 around the service vehicle 102 or distressed vehicle 104 to ensure that approaching vehicles 110 avoid the obstacle (e.g., pothole).

The alert system 200 may also be operable to store the locations, topographical data, and weather conditions within memory 208 when servicing a distressed vehicle 104. The alert system 200 may use this information to generate analytical data about common locations where a distressed vehicle 104 requires service. If a given location routinely involves a distressed vehicle 104 requiring service, the alert system 200 may notify local authorities. The alert system 200 may also provide local authorities with data regarding potential reasons why there are increased numbers of distressed vehicles 102 in a given location. For instance, the alert system 200 may be operable to assess analytical data that includes topographical, satellite images, or surface maps acquired from the LiDAR sensor 210, radar 212, camera 214, or GPS 215 to determine that a given location may include several large potholes. The alert system 200 may be operable to transmit the analytical data using network interface 220. The analytical data may be received by local authorities that can use the information to correct or rectify the pothole.

The alert system 200 may further employ a microphone (e.g., within the camera 214) to record and analyze the voice analytics during which a service technician is servicing a distressed vehicle 104. The voice analytics may then be further processed to determine the satisfaction of the customer while the distressed vehicle is being serviced. If the alert system 200 determines a positive customer satisfaction, the alert system 200 may be enabled to provide a post to a social networking website (e.g., LinkedIn or Facebook) about the service technician and the work performed. Also, the alert system 200 may further be enabled to track the response time and time required to service a distressed vehicle 104. Again, the alert system 200 may then be operable to post updates to social networking websites about the response or service times. Or the time update may be used to inform another potential customer about their expected wait time.

It is further contemplated that occupants of the distressed vehicle 104 may be able to fill out an application process that is accessible using external network 222 by the alert system 200. The application process may be part of an enrollment system with an insurance agent (e.g., AAA of Michigan). The application process may include emergency contact information. The alert system 200 may be operable to provide alerts to the emergency contacts when the alert system 200 is deployed for the occupants of the distressed vehicle 104.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A roadside alert system comprising:
- a sensor configured to project signals towards an approaching vehicle to detect a velocity and distance of the approaching vehicle;
- a motorized assembly to self-level the sensor;
- a plurality of alert beacons including an audible alert beacon and a visual alert beacon having a warning light system, the plurality of alert beacons configured to alert when the sensor detects the velocity is above a threshold velocity and the distance is below a threshold distance; and
- a rechargeable power supply to operate the sensor and plurality of alert beacons.

2. The alert system of claim 1, wherein the roadside alert system is designed as a traffic cone.

3. The alert system of claim 1, wherein each of the plurality of alert beacons operates independently.

4. The alert system of claim 1, wherein the distance and the velocity of the approaching vehicle is determined from a plurality of beta readings.

5. The alert system of claim 1, further comprising a mobile software application downloaded on a mobile device that deploys an audible or visual alert on the mobile device when the sensor detects the velocity is above a threshold velocity and the distance is below a threshold distance.

6. The alert system of claim 1, wherein the alert system is hermetically sealed enclosure.

7. The alert system of claim 1, wherein the alert system is positioned in an Ingress Protection enclosure.

8. The alert system of claim 1, wherein the audible alert beacon includes a siren.

9. The alert system of claim 1, wherein je warning light system includes a bucket light.

10. The alert system of claim 1, further comprising a network interface device to communicate with an external network.

11. The alert system of claim 1, wherein the alert system is configured to perform an error checking to remove false positives of an alert.

12. An alert system for deployment by a roadside technician, the alert system comprising:
- a warning light;
- a speaker;
- a sensor positioned to project towards oncoming vehicles; and
- a processor configured to:
  - receive a plurality of readings from the sensor;
  - recognize a first traffic path and path from the plurality of readings;
  - determine a distance and a velocity of an approaching vehicle responsive to the approaching vehicle traveling along the second traffic path and not the first traffic path; and
  - initiate an alert with the warning light and the speaker responsive to the distance being less than a predetermined distance and the velocity being greater than a predetermined velocity.

13. The alert system of claim 12, wherein the alert system is positioned in a cone shaped enclosure.

14. The alert system of claim 12, wherein the sensor includes a LiDAR sensor, radar sensor, or camera.

15. The alert system of claim 12, wherein the sensor includes a radar sensor.

16. The alert system of claim 12, further comprising a GPS.

17. The alert system of claim 12, further comprising a plurality of sensors for detecting an approaching vehicle in a plurality of directions.

18. A mobile alert system for deployment along a roadside, the mobile alert system comprising:

a sensor arranged to project a signal towards approaching vehicles in a shoulder or traffic lane when the mobile alert system is respectively positioned near the edge of the shoulder or the traffic lane such that the mobile alert system detects corresponding velocities and corresponding distances of the approaching vehicles;

a plurality of alert beacons including a speaker and a light system; and a processor operable to receive a plurality of readings from the sensor recognize a permissible traffic path and provide warnings through the speaker and the light system when an approaching vehicle deviates from the permissible traffic path, the approaching vehicle is at a distance less than a predetermined distance from the one or more sensors and the approaching vehicle is traveling at a velocity above a predetermined velocity.

19. The alert system of claim 18, wherein the alert system operates as a traffic cone.

20. The alert system of claim 18, wherein the mobile alert system is configured to be positioned behind and away from a distressed vehicle and/or service vehicle.

* * * * *